Figure 1:
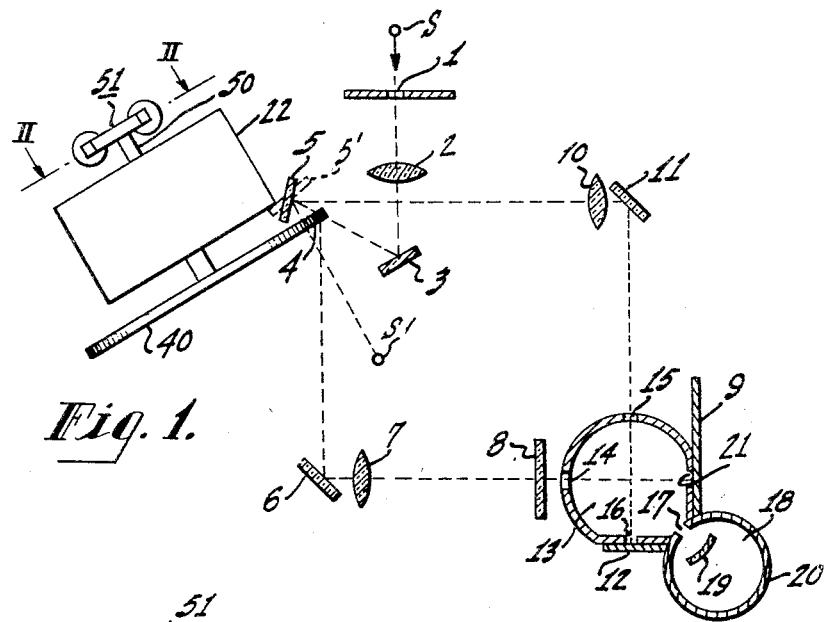

July 18, 1950     G. L. DIMMICK     2,515,762
COMMUTATOR FOR SPECTROPHOTOMETER INDICATOR CIRCUIT
Filed Feb. 11, 1947     2 Sheets—Sheet 1

INVENTOR
GLENN L. DIMMICK
BY
ATTORNEY

INVENTOR
GLENN L. DIMMICK
BY
ATTORNEY

Patented July 18, 1950

2,515,762

UNITED STATES PATENT OFFICE 2,515,762

COMMUTATOR FOR SPECTROPHOTOMETER INDICATOR CIRCUIT

Glenn L. Dimmick, Haddon Heights, N. J., assignor to Radio Corporation of America, a corporation of Delaware Application February 11, 1947, Serial No. 727,901

2 Claims. (Cl. 88—14)

This invention relates to improvments in the indicator or recording circuit of an electronic spectrophotometer and, more particularly, to the substitution of an electronic commutator for a mechanical commutator in the recording circuit of a spectrophotometer which includes an automatic gain control circuit.

A spectrophotometer of the type with which the present invention has particular utility is described and claimed in co-pending application, Serial No. 657,974, filed March 29, 1946, now Patent No. 2,474,098. The apparatus described and claimed in the said application has several related uses. Among these are the comparing and standardizing of colored materials in many industries such as the paint and textile industries and the measuring of relative intensities of light sources.

The following is a general description of the operation of the apparatus of the type described in the said application, Serial No. 657,974. Light, preferably from a single source, is directed along two different paths by a light chopper comprising a rotatable disc, part of the surface of which consists of a mirror which may have one but preferably has two segments and which disc also has a segment cut away. Light from a single source is directed toward the disc. When either of the mirror segments is in the path of the beam, the light is reflected along one path where it may be passed through a light transmitting sample or caused to reflect from a reflection sample from which it is directed onto the cathode of an electron multiplier phototube. When the cutaway portion of the rotating disc is in the path of the light beam, the light passes through and is reflected from a mirror appropriately placed behind the disc and the light then follows a different path leading to a standard reflecting surface such as a face of a block of magnesium carbonate. From the standard, the light is also directed to the cathode of the electron multiplier phototube. Each path is illuminated alternately, the alternations being very rapid and consequently of short duration. The light impulses thus received by the multiplier tube are converted into anode current pulses. Those pulses which are the result of light being received from the standard are used to set the overall gain of the amplifying system which includes a vacuum tube amplifier. The alternate pulses, which are initiated by light being received from the test sample are amplified and their amplified value is then indicated on a microammeter or permanently recorded by means of a recording device.

In the above described device, in order to separate the measuring light pulses received from the test sample from the gain control pulses received from the standard, a mechanical commutator is used. This commutator is fixed on the shaft of the motor driving the rotatable disc. The rotor of the commutator has a contact surface, part of which is electrically conductive and part of which is non-conductive. The commutator also has two brushes which may be of graphite or graphite and silver. When both brushes are making contact with the conductive portion of the surface, the output circuit of the amplifier is completed through the indicating device. This portion of the commutator cycle is set to correspond to that period when light pulses are being received by the photocell from the test sample. During the remainder of the commutator cycle, the circuit through the indicating device is open. During this period, light is being received by the photocell from the standard and the overall gain of the amplifying system is being adjusted.

Although the operation of the apparatus is entirely satisfactory as long as the commutator is functioning properly, the brushes become worn in time and graphite is gradually spread over the non-conductive portion of the rotor surface causing its insulating properties to be lessened. This requires renewal of the brushes and cleaning of the rotor surface to place the instrument back in proper working order.

The present invention relates to an improved type of commutator having as its general object the elimination of the faults inherent in the mechanical commutator.

A more specific object of the present invention is the provision of improved means for opening and closing the circuit through the indicating means associated with an electronic spectrophotometer having an automatic gain control circuit responsive to light pulses received from a standard reflecting surface.

Another object of the invention is the provision of improved means for separating the measuring pulses of electrical current from the gain control pulses of electrical current in the output circuit of an amplifier of a spectrophotometer which utilizes pulses of light received from a standard to automatically set the overall gain of its amplifying system.

Still another object of the invention is the provision of improved means for closing the circuit through the indicating means of an electronic spectrophotometer in synchronized relation to the periods when light from the test sample is being received by the photosensitive device.

Figures 2, 3:
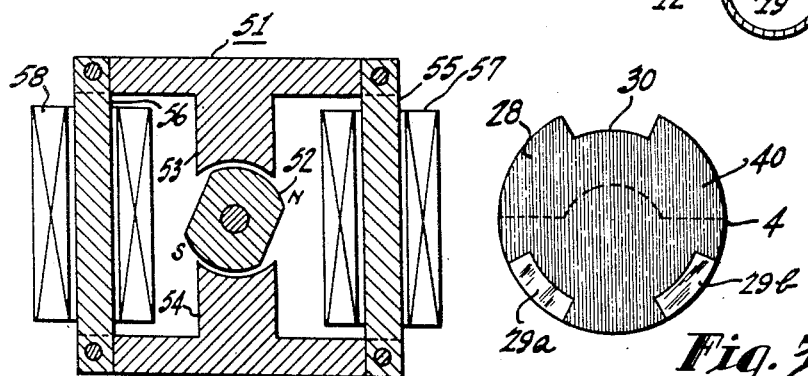
Figure 5:
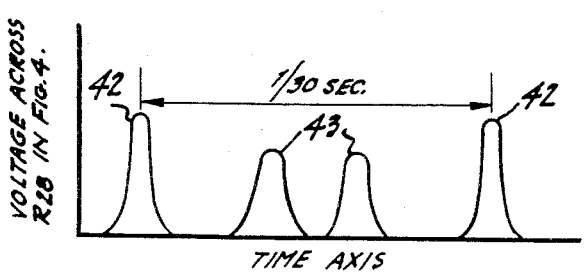
Figure 4:
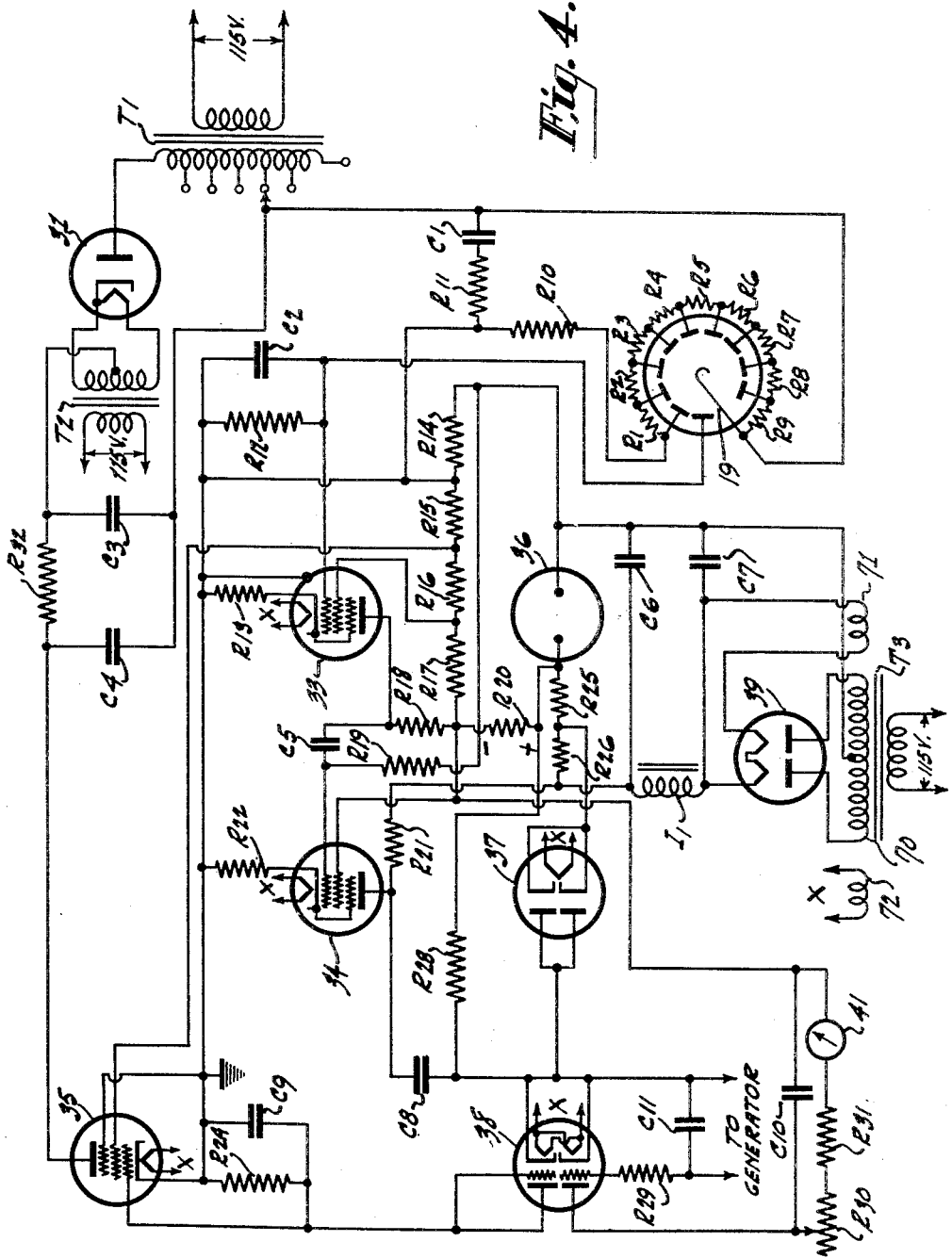

These and other objects will be more readily apparent and the invention will be better understood from the following description, including the specification and the drawings of which, Fig. 1 is a plan view partly in section and partly diagrammatic of an optical system and the generator portion of a commutator which may be used in the present invention, Fig. 2 is an elevational section view of the generator taken along the line II—II of Fig. 1, Fig. 3 is a detail view of the rotatable disc of a form of light chopper which may be used with the present invention, Fig. 4 is a circuit diagram of one form of automatic gain control and measuring circuit with which the present invention may be used, and Fig. 5 is a graphical illustration comparing the gain control and the measuring pulses.

Referring to Fig. 1, which shows one form of optical system suitable for use in the invention—

By passing white light through a spectrometer, light of any desired wavelength may be obtained. Although spectrometers of various types may be used, a curved grating spectrometer is convenient and may be employed in this case. As shown in Fig. 1, light from a source S passes through the exit slit 1 of a spectrometer, then passes through a focusing lens 2 and strikes a mirror 3. From this mirror, the light is reflected to mirrors 4 or 5. Lens 2 forms an image of the curved grating in the spectrometer on the mirror 4. The mirror 4 is on a disc 40 which is at one end of a shaft 50 rotated at high speed by a motor 22. This mirror covers only a part of the disc 40 and reflects light for only a portion of each revolution of the motor 22. During another portion of each revolution of the motor, the light passes to mirror 5 where it is reflected along a path through lens 10 to mirror 11. Here, it is deviated 90° and passes through window 15 in a small integrating sphere 13 and through another window 16 on the opposite side of the sphere to a white standard such as a block of magnesium carbonate 12. Light reflected from mirror 4 is again reflected from mirror 6 through lens 7 and into the integrating sphere through window 14. If a transmitting test sample is being measured, it is placed at 8, or if a reflecting sample is used, this sample is placed at 9, adjacent window 21. If a transmitting test sample is to be placed at 8 and measured, a block of a white reflecting material, which is preferably magnesium carbonate, is placed at 9 and the recording meter, to be further described, is set at full scale reading. The transmitting sample is then inserted at 8 and measured in terms of the white standard. The integrating sphere is preferably smoked with magnesium oxide on its inner surface. From the exit window 17, light passes out of the integrating sphere into an electron multiplier 18, the cathode of which is shown at 19. A light shield 20 excludes stray light. Directly reflected rays from standard 12 and test sample 9 cannot reach the multiplier cathode. Only the light which is diffusedly reflected from the walls of the sphere can enter the electron multiplier.

Lenses 10 and 7 perform the function of reforming the image at mirror 4 upon the standard 12 and test sample 9. The rays of light passing through windows 21 or 16 have a cross sectional area considerably less than the area of the windows through which they are passing since it is desired to keep the light from striking the edge of any of the windows. It is quite necessary that all of the light from each beam be thoroughly integrated before entering the electron multiplier.

As previously stated, the mirror 4 covers only a part of disc 40. It, therefore, in the form of the invention now being described, acts as a light chopper when the disc rotates. Mirror 4 is shown in greater detail in Fig. 3. As shown in this figure, a black mask 28 is placed over the mirror covering all of its surface except the areas 29a and 29b. Each of the mirror sections may cover a portion of about 45° of arc of the entire circle, representing a circumference of disc 40. Although it is possible to use only one mirror section, it is preferred to use two since this provides two measuring pulses and thereby increases sensitivity. In the present form of the invention, it is preferred to use an amplifier which passes only a narrow band of frequencies. In this case, if only one long mirror section were used instead of the two which are shown, the fundamental frequency of the measuring pulse would be so low that it would not pass through the amplifier. Limiting the amplifier to a narrow frequency band is desirable in order to obtain the highest possible signal-to-noise ratio. The use of two mirror segments is one of the improvements of the present invention as compared to my previously referred to application, Serial No. 657,974.

Fig. 4 is a circuit diagram showing how an electron multiplier 18 such as a 1P22 is connected into an automatic gain control circuit such that its response to light pulses incident on the cathode 19 will depend only on the wavelength of the light and be independent of variations in intensity of the light source as well as compensating for differences in sensitivity of the multiplier tube throughout the spectrum.

A.-C. line voltage is stepped up to 610 v. by the transformer $T_1$ and rectified by the diode 31, which may be a type 2X2. The transformer $T_2$ supplies filament voltage to the rectifier tube 31 while capacitances $C_3$ and $C_4$ and resistor $R_{32}$ smooth out the rectified voltage in the usual manner. This rectified input voltage is connected through a gain control tube 35, which may be a 6AC7, to potential divider $R_1$ to $R_{10}$, thus supplying voltage to the cathode, anode, and the nine dynodes of the multiplier tube 18.

Since the resistors $R_1$ to $R_{10}$ in series are connected as the load resistors in the plate circuit of the gain control tube 35, the voltage appearing across these load resistors depends upon the voltage applied to the control grid of the control tube. The control tube is shown as a 6AC7 which is connected as a pentode so as to obtain a very high voltage amplification. Since the sensitivity of the photomultiplier is a very sensitive function of the voltage applied to its dynodes, the above arrangement provides a means for producing a very large change in multiplier sensitivity with a small change in voltage on the control grid of tube 35. As an example, when the voltage on the control grid of tube 35 is varied 0.2 v., the sensitivity of the photomultiplier varies about 5 to 1.

Between the cathode and control grid of tube 35 is inserted resistor $R_{24}$ in parallel with capacitor $C_9$. When no energy is supplied to this part of the circuit, the capacitor is discharged and the control grid is at cathode potential. Under this condition, a minimum amount of voltage is stored in tube 35 and a maximum amount appears across $R_1$ to $R_{10}$, thus giving maximum sensitivity to the multiplier.

When pulses of light strike the cathode of the photomultiplier, they produce pulses of current in the anode circuit which includes $R_{12}$. The voltage appearing across $R_{12}$ is impressed upon the control grid of the tube 33, which may be a 6SH7 connected as a pentode and amplified voltage appears across plate resistor $R_{18}$. This voltage is coupled to the grid of tube 34, which may be a 6V6, by means of capacitor $C_5$ and resistor $R_{19}$. A voltage pulse having still greater amplification then appears across plate resistor $R_{21}$ of tube 34.

The voltage pulses appearing across $R_{21}$ are fed through capacitor $C_8$ to resistor $R_{28}$. A constant voltage discharge tube 36, which is preferably a VR105, is connected in series with $R_{28}$, so that the difference in their voltages is impressed through the upper half of the double triode 38, which half is connected as a diode, upon resistor $R_{24}$ and capacitor $C_9$. The voltage across $R_{28}$ is of opposite polarity to that appearing across the constant voltage tube 36. When the voltage appearing across $R_{28}$ is less than the voltage across tube 36, a positive potential is impressed on the upper cathode of tube 38 and no current flows in resistor $R_{24}$ and no charge is stored on capacitor $C_9$. When the peak voltage appearing across $R_{28}$ rises above that of the constant voltage tube, a negative potential equal to the difference between these two is impressed on the upper cathode of tube 38 and current immediately starts to flow into capacitor $C_9$. A negative voltage is thus impressed on the control grid of tube 35, which in turn reduces the sensitivity of the photomultiplier and, therefore, the magnitude of the voltage pulse appearing across $R_{28}$.

Condenser $C_9$ discharges through $R_{24}$ so that the voltage appearing across the control grid of tube 35 decreases unless it is intermittently energized. When a continuous series of light pulses is impressed on the cathode of the photomultiplier tube 18, an equilibrium condition is quickly established. This equilibrium is reached when the peak voltage pulses appearing across $R_{28}$ are just enough higher than the voltage of the constant voltage tube 36 to maintain a required charge on capacitor $C_9$. This charge on $C_9$ must be sufficiently high to provide a voltage on the control grid of tube 35 large enough to establish a degree of sensitivity in the photomultiplier to provide the voltage pulses across $R_{28}$ of the required value. If the peak voltage pulses appearing across $R_{28}$ rise higher than the equilibrium value described above, the voltage on the control grid of tube 35 will be increased and gain of the multiplier decreased. If peak voltage appearing across $R_{28}$ is less than the equilibrium value described, the charge on $C_9$ will leak off through $R_{24}$ and the voltage on the control grid of tube 35 will decrease, thereby increasing the sensitivity or gain of the photomultiplier tube. Since the constant voltage tube 36 maintains a potential of 105 v. and since it takes only about 0.2 v. change on the control grid of tube 35 to bring about a 5 to 1 change in photomultiplier sensitivity, it can be seen that the gain control system described has the ability to maintain constant photomultiplier sensitivity with a high degree of accuracy.

Since both the gain control pulses and the measuring pulses appear across $R_{28}$, the ones having the highest amplitude will, of course, be effective in setting the gain. As shown in Fig. 5, the measuring pulses 43 are always lower in amplitude than the gain control pulses 42. This is because of the load produced by capacitor $C_{10}$ and resistors $R_{30}$ and $R_{31}$ in the circuit of meter 41. The meter 41 may be a microammeter but if a permanent record is desired, there may be substituted an automatic recorder of which there are several types in common commercial use.

One of the improvements of the present invention is the use of an electronic commutator instead of the mechanical type previously used. The improvement results in much more reliable operation over longer periods of time. As shown in Fig. 1 and with more detail in Fig. 2, this commutator comprises a small two pole A.-C. generator 51 and an associated electrical circuit, which circuit is part of the entire circuit shown in Fig. 4.

The generator includes a small Alnico magnet 52, fully magnetized, which is fastened to one end of the shaft 50 of synchronous motor 22 to the other end of which is attached the rotating disc 40 used as a light chopper. Pole pieces 53 and 54 may be made of laminated transformer iron, silicon steel or other suitable material. Across the pole pieces are bolted or welded legs 55 and 56 which may be made of the same material as the pole pieces. Two coils 57 and 58 are wound on legs 55 and 56, respectively. These coils, which are connected in series, are wound with enough turns to develop a peak A.-C. voltage of about 30.

The generator 51 is connected to the grid and to the cathode of the lower triode half of tube 38. A resistor $R_{29}$ is connected in series with the grid lead, the purpose of this resistor being to limit the amplitude of the positive voltage during one-half of the cycle. The phase of the generator is, of course, very important. The grid must reach its peak negative value at the same instant that the peak of the gain control pulse is passing through the amplifier. A capacitor $C_{11}$ is connected across the generator output leads for the purpose of producing a sine wave output. This capacitor alters the phase relation between the voltage and deflection of the magnet 52, so that it is necessary to set the proper phase by means of a cathode ray oscilloscope. This is easily accomplished by connecting the oscilloscope between the grid of the commutator triode half of tube 38 and the right side of the resistor $R_{28}$. The oscilloscope will then show the sum of the generator voltage and the three electrical pulses (one gain control and two measuring) passing through the amplifier. The light chopper can be rotated on its shaft to change the phase, so that the peak of the negative half cycle of the generator coincides with the peak of the gain control pulse.

The manner in which the improved commutator operates when the apparatus is used as a spectrophotometer is as follows: Using the type of optical system shown in Fig. 1, a series of light pulses is allowed to strike the cathode 19 of photomultiplier 18. These pulses come from a rotating mirror light chopper 40 attached to the shaft 50 of an 1800 R. P. M. synchronous motor 22. During each revolution of the motor, one pulse of light is reflected along a path leading to a reflecting standard such as a block of magnesium carbonate, while two other pulses of light are reflected along another path where they are reflected from or transmitted through the unknown test sample. As stated previously, the double pulse for the latter function is obtained by providing two mirror segments 29a and 29b. The gain of the system is established by the gain control circuit in response to light reflected from the magnesium carbonate standard, and the capacitor $C_9$ causes this gain to be held during the next pair of pulses coming from the test sample. The permanent magnet rotor 52 of the generator which forms a part of the electronic commutator is driven from the same shaft 50 which carries the light chopper. The voltage from the A. C. generator is impressed upon the grid of the lower half of double triode 38, thereby preventing current flow therethrough during the negative one-half of the cycle. This is the portion of the cycle when the gain control pulse is acting to regulate gain of the multiplier tube.

The next half cycle a positive voltage from the generator is impressed upon the lower grid and the tube becomes a good conductor. This is the portion of the cycle when the double measuring pulse is passed through the multiplier and amplifier and charges capacitor $C_{10}$ of the peak reading circuit, including the resistors $R_{30}$ and $R_{31}$ and measuring meter 41.

The height of the measuring pulse is, of course, proportional to the amount of light reflected from the reflecting sample or transmitted through the transmission sample. If a microammeter is used, the reading will be adjusted to read full scale when the light is being reflected from a white reflecting surface, preferably magnesium carbonate, inserted behind window 21. In the case of a reflecting test sample, a piece of the test surface is inserted in place of the white surfaced material positioned behind window 21 and the percentage of reflection as compared to reflection from the standard 12 is read on the meter. The meter is conveniently calibrated in percent.

In the case of a transmission sample, a reading on meter 41 is first taken with sample 8 not present and a white reflecting surface, as in the preceding example, inserted behind window 21. As in the previous example, the meter is set to read full scale. Then the sample, which could be a color filter, is inserted in the light beam as at 8 and another reading observed on the meter. Since less light will always be transmitted through a test sample than through air alone, the reading on the meter will always be less than full scale and will be proportional to the percentage of light transmitted.

Since both the gain control pulse and measuring pulse appear across $R_{28}$, it is necessary that all transient effects of the gain control pulse be dissipated before the double measuring pulse appears. To accomplish this, a diode 37 is placed across the resistor $R_{28}$. This tends to short circuit $R_{28}$ when the negative portion of the transient appears across it. The capacitor $C_8$ is thus able to discharge quickly and reestablish an equilibrium before the measuring pulse is received. The resistor $R_{25}$ supplies a small bias voltage of such value as to utilize the optimum operating characteristics of the rectifier.

The junction of capacitor $C_{10}$ and meter 41 is connected to the negative side of resistor $R_{20}$ which supplies just sufficient voltage to balance thermal voltage from the lower half of tube 38. This is also for the purpose of obtaining a near zero reading on the meter when the height of the measuring pulse is zero and to supply a bias voltage of such value as to utilize the best operating characteristics of the tube.

The plate voltage for tubes 33 and 34 is supplied from the transformer $T_3$, which may have a 650 v. center-tapped winding 70, a 5 v. filament winding 71 and a 6.3 v. filament winding 72. The 650 v. winding is used in connection with the full-wave rectifier tube 39 to obtain a D.-C. voltage of 360 v. for the anodes of the tubes 33 and 34, the screen grids of the tubes 33, 34 and 35, and the control tube 36. The 5 v. winding 71 supplies power to the filament of the rectifier tube 39. The 6.3 v. winding 72 supplies heater power for the tubes 33, 34, 35, 37 and 38, the leads for which are indicated but not shown. Capacitors $C_6$ and $C_7$ and reactor $I_1$ comprise a filter for the power supply which includes tube 39. A bleeder consisting of resistances $R_{14}$, $R_{15}$, $R_{16}$, $R_{17}$ and $R_{20}$ is placed across the constant voltage tube 36. The potential across the bleeder is thus maintained constant. The screen grid voltage for tube 33 is obtained from a tap between $R_{16}$ and $R_{17}$. The screen grid voltage for tube 34 is obtained from a tap between $R_{17}$ and $R_{20}$ and screen grid voltage for tube 35 is obtained from the tap between $R_{15}$ and $R_{16}$. $R_{14}$ supplies the negative bias to the grid of tube 34. $R_{20}$ supplies negative bias to the cathode of tube 38. Cathode resistors $R_{13}$ and $R_{22}$ are inserted for the purpose of obtaining better linearity from the tubes and to obtain the best operating point on the tube characteristics.

The very sensitive gain control circuit described would ordinarily be subject to oscillation if the required conditions of attenuation and phase shift were not adhered to. In other words, the overall gain in the gain control system must be reduced to unity or lower when the phase shift reaches 180°. The capacitors $C_1$ and $C_2$ are for the purpose of producing necessary attenuation with frequency so as to prevent oscillation. Resistor $R_{11}$ is for the purpose of improving stability of the gain control circuit. Capacitor $C_9$ must of necessity discharge quite slowly since the time constant of $R_{24}$ and $C_9$ is approximately 1 second. Resistor $R_{11}$ is also for the purpose of limiting the speed at which $C_1$ can charge.

Circuit constants used in the circuit illustrated in Figure 4 are as follows:

$R_1$ to $R_{10}$, inclusive,=270,000 ohms each.
$R_{11}$=22,000 ohms.
$R_{12}$=1.0 megohm
$R_{13}$=750 ohms
$R_{14}$=780 ohms
$R_{15}$=8,200 ohms
$R_{16}$=3,300 ohms
$R_{17}$=10,000 ohms
$R_{18}$=47,000 ohms
$R_{19}$=1 megohm
$R_{20}$=120 ohms
$R_{21}$=20,000 ohms
$R_{22}$=240 ohms
$R_{24}$=2.2 megohms
$R_{25}$=68 ohms
$R_{26}$=20,000 ohms
$R_{28}$=100,000 ohms
$R_{29}$=27,000 ohms
$R_{30}$=0.5 megohm
$R_{31}$=1.5 megohms
$R_{32}$=220,000 ohms
$C_1$=1.0 mfd.
$C_2$=0.0015 mfd.
$C_3$=0.125 mfd.
$C_4$=0.25 mfd.
$C_5$=0.15 mfd.
$C_6$=20 mfd.
$C_7$=20 mfd.
$C_8$=0.04 mfd.
$C_9$=0.5 mfd.
$C_{10}$=0.25 mfd.
$C_{11}$=0.25 mfd.
$I_1$=15 henries
  400 ohms
$T_1$=1200 v. (secondary winding)
$T_2$=1500 v. (secondary winding)
$T_3$=650 v., 6.3 v., 5v.

The gain control circuit performs many valuable functions in this type of spectrophotometer. Through its regulation of the overall amplification factor of the complete amplification system it compensates for wide variations in line voltage which cause fluctuations in intensity of the light source and for the considerable differences always present in intensity of light output of the light source at different wavelengths within the spectrum band. In addition, it compensates for the variations in sensitivity occurring between one photomultiplier tube and another and takes care of individual variations in sensitivity at different wavelengths occurring in any one tube. It also nullifies any changes which may occur in the reflectivity of the interior of the integrating sphere and makes possible the use of randomly selected stock tubes in the amplifier stages. The gain control circuit does all this because it keeps the final voltage output of the amplifying system substantially constant during each period of time a pulse of light is being received by the photosensitive element from the light source other than the test sample. This pulse has been referred to more specifically as the gain control pulse and the light received during this pulse has been reflected from a white standard surface. This voltage output is maintained at the same constant value during the subsequent measuring pulse which occurs while light is being received by the photosensitive element from the test sample.

Suppose, for example, that during one of the periods occupied by a gain control pulse the line voltage to the light source S has dropped and the light has diminished slightly in intensity as a result. The light impinging on the photocathode of the photomultiplier tube drops correspondingly and, as a consequence, the electron current travelling between the cathode of the photomultiplier and the first dynode decreases by a proportional amount. But the gain control circuit at the same time raises the amplification factor of the amplifying system slightly by an amount such that the output voltage of the final amplifier stage remains constant at its former value and the effect of the line voltage fluctuation has been entirely nullified. Any other factors which normally effect the amount of electron current leaving the photomultiplier cathode during the gain control pulse are similarly compensated for.

Since this instrument is essentially the same as that described in co-pending application, Serial No. 657,974, previously referred to, it can be used for all of the many applications described in connection with the instrument.

In addition to comparing color values, the device also provides an improved means for measuring the intensity of a light source compared to that of a standard. When used for this latter purpose, the same apparatus may be used with but slight modification. In this case and also as illustrated in Fig. 1, a standard light source may be placed at S. First, a reading is taken on the standard with the mirror behind the rotating disc 40 in position as shown at 5. Blocks of a white reflecting standard are inserted at both 9 and 12. The meter 41 is adjusted to full scale reading. The standard S is then removed from position at S and placed at $S^1$. A test source to be measured is placed at S and the mirror behind the rotatable disc is changed to position $5^1$. The system is again set in operation with the disc 40 rotating and a new reading is taken on meter 41. The source $S^1$ then is used to set the overall gain of the amplifier and the proportional intensity of the test sample at S will be read on the meter 41 as a percentage of the intensity of light emitted by the standard.

There has thus been described an improved apparatus for either measuring color values or comparing the intensity of a light source with that of a standard. The improvements are not limited to use with the exact circuit described nor with the precise optical system illustrated but may be used in any similar system utilizing alternate pulses of light to set the gain of an amplifying system and to measure a test sample with the output of an amplifying system being applied to some indicating means only during the duration of one of the types of pulses.

I claim as my invention:

1. In apparatus for indicating light values, including a device having a light sensitive element, said device being capable of producing an electrical current output proportional to the intensity of light received by said element, a rotatably mounted light chopper comprising a disc having on a surface thereof at least two reflecting portions spaced apart on the periphery of said surface such that closely spaced pulses of light are produced when said disc is rotated, said disc also having a light transmitting portion, means for rotating said light chopper at a predetermined rate, means for directing light to said light chopper, means for directing light reflected from said reflecting portions to said light sensitive element along a path including a test sample, means for directing light transmitted through said light transmitting portion to said element along another path, means for amplifying the current output of said device, said amplifying means being adapted to pass a predetermined band of frequencies including the frequency of current output produced in said device by the light pulses received by said element from said reflecting portions, means for indicating the value of the current amplified by said amplifying means, circuit means associated with said amplifying means for setting the overall gain of said amplifying means in response to light directed to said element along said other path, and commutator means rotating in synchronism with said light chopper for applying the current output of said amplifying means to said indicating means only during the time light is being received by said element from said reflecting portions.

2. Apparatus according to claim 1 in which said commutator means is an alternating current generator mounted so as to produce positive potentials during the time light is being directed to said light sensitive element along the first mentioned one of said paths and to produce negative potentials during the time light is being directed to said light sensitive element along the second mentioned one of said paths, and means for applying the output of said amplifying means to said indicating means during the occurrence of said positive potentials and for disconnecting the output of said amplifying means from said indicating means during the occurrence of said negative potentials.

GLENN L. DIMMICK.

REFERENCES CITED

The following references are of record in the file of this patent:

UNITED STATES PATENTS

| Number | Name | Date |
| --- | --- | --- |
| 1,565,488 | Moore et al. | Dec. 15, 1925 |
| 1,932,337 | Dowling | Oct. 24, 1933 |
| 2,361,549 | Kott | Oct. 31, 1944 |
| 2,388,727 | Dench | Nov. 13, 1945 |
| 2,411,741 | Michaelson | Nov. 26, 1946 |
| 2,442,910 | Thomson | June 8, 1948 |